United States Patent
Hirabayashi et al.

(10) Patent No.: US 12,159,755 B2
(45) Date of Patent: Dec. 3, 2024

(54) MULTILAYER CAPACITOR

(71) Applicant: TDK CORPORATION, Tokyo (JP)

(72) Inventors: Hikaru Hirabayashi, Tokyo (JP); Daisuke Yoshida, Tokyo (JP); Masato Kimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/682,460

(22) Filed: Feb. 28, 2022

(65) Prior Publication Data

US 2022/0285093 A1     Sep. 8, 2022

(30) Foreign Application Priority Data

Mar. 2, 2021    (JP) .................................. 2021-032743

(51) Int. Cl.
   *H01G 4/005*    (2006.01)
   *H01G 4/232*    (2006.01)
   *H01G 4/248*    (2006.01)
   *H01G 4/30*     (2006.01)

(52) U.S. Cl.
   CPC ............ *H01G 4/005* (2013.01); *H01G 4/232* (2013.01); *H01G 4/248* (2013.01); *H01G 4/30* (2013.01)

(58) Field of Classification Search
   CPC ........ H01G 4/30; H01G 4/1227; H01G 4/248; H01G 4/232; H01G 4/005
   USPC ............ 361/301.4, 303, 306.3, 321.1, 321.3, 361/321.4
   See application file for complete search history.

(56) References Cited

U.S. PATENT DOCUMENTS

| | | | | |
|---|---|---|---|---|
| 5,712,758 | A  * | 1/1998 | Amano | H01G 4/2325 |
| | | | | 361/306.3 |
| 8,194,388 | B2 * | 6/2012 | Koppel | H01C 17/281 |
| | | | | 361/311 |
| 9,779,873 | B2 * | 10/2017 | Kim | H01G 4/248 |
| 2004/0190221 | A1 * | 9/2004 | Yamaguchi | H01G 4/30 |
| | | | | 361/306.3 |
| 2006/0245141 | A1 * | 11/2006 | Shirasu | H01G 4/012 |
| | | | | 361/303 |
| 2008/0239617 | A1 * | 10/2008 | Motoki | H01G 4/30 |
| | | | | 29/25.42 |
| 2012/0073129 | A1 | 3/2012 | Abe et al. | |

(Continued)

FOREIGN PATENT DOCUMENTS

| | | |
|---|---|---|
| JP | 2003-318060 A | 11/2003 |
| JP | 2007-142118 A | 6/2007 |
| JP | 2012-094819 A | 5/2012 |

*Primary Examiner* — Arun Ramaswamy
(74) *Attorney, Agent, or Firm* — Oliff PLC (57) ABSTRACT

A multilayer capacitor includes an element body having a pair of end surfaces, and a pair of side surfaces and a pair of main surfaces; and a pair of external electrodes. The element body includes an inner layer portion in which a plurality of internal electrodes and a plurality of dielectric layers are alternately stacked in a second direction where the pair of main surfaces face each other, and a pair of outer layer portions disposed outside the inner layer portion in the second direction. On at least one of the pair of end surfaces, the internal electrode of the inner layer portion protrudes outward in the first direction from the outer layer portion by a predetermined protrusion amount. A ratio of the protrusion amount to a dimension of one outer layer portion in the second direction ranges from 96,000 ppm to 176,000 ppm.

8 Claims, 8 Drawing Sheets

(56) References Cited

U.S. PATENT DOCUMENTS

| | | | |
|---|---|---|---|
| 2014/0367152 A1* | 12/2014 | Lee | H01G 4/232 |
| | | | 361/301.4 |
| 2014/0368970 A1* | 12/2014 | Ichikawa | C08G 18/6212 |
| | | | 525/534 |
| 2016/0268047 A1* | 9/2016 | Shin | H01G 4/232 |
| 2017/0301471 A1* | 10/2017 | Ono | H01G 4/224 |
| 2019/0164693 A1* | 5/2019 | Ono | H01G 4/30 |
| 2020/0058447 A1* | 2/2020 | Choe | H01G 4/30 |

\* cited by examiner

UNIT: μm

| COMPONENT NAME | OUTER SHAPE OF BASE MATERIAL | | | | Gap DIMENSION | | | | | PROTRUSION RATIO | | | CAPACITANCE VALUE | 400°C |
|---|---|---|---|---|---|---|---|---|---|---|---|---|---|---|
| | L | W | T | PROTRUSION | L | R | W | T | W2 | WD | β/a ppm | DIMENSION ppm | LID THICKNESS ppm | CV | THERMAL CRACK |
| COMPONENT A | 1715 | 995 | 995 | 8 | 95 | 75 | 95 | 90 | 300 | 400 | 4,709 | 8,040 | 88,889 | 0.0387 | 0% |
| COMPONENT B | 2110 | 1400 | 1430 | 12 | 95 | 92 | 95 | 120 | 400 | 600 | 5,947 | 8,671 | 103,333 | 0.0351 | 0% |
| COMPONENT C-1 | 3180 | 1680 | 1650 | 18 | 144 | 50 | 160 | 150 | 160 | 1360 | 5,864 | 11,170 | 122,867 | 0.0155 | 0% |
| COMPONENT C-2 | 3180 | 1680 | 1650 | 19 | 144 | 50 | 160 | 150 | 160 | 1360 | 6,134 | 11,679 | 128,467 | 0.0115 | 0% |
| COMPONENT C-3 | 3180 | 1680 | 1650 | 22 | 144 | 50 | 160 | 150 | 160 | 1360 | 6,886 | 13,091 | 144,000 | 0.0096 | 0% |
| COMPONENT C-4 | 3180 | 1680 | 1650 | 23 | 144 | 50 | 160 | 150 | 160 | 1360 | 7,446 | 14,139 | 155,533 | 0.0098 | 0% |
| COMPONENT C-5 | 3180 | 1680 | 1650 | 26 | 144 | 50 | 160 | 150 | 160 | 1360 | 8,241 | 15,624 | 171,867 | 0.0087 | 20% |
| COMPONENT C-6 | 3180 | 1680 | 1650 | 29 | 144 | 50 | 160 | 150 | 160 | 1360 | 9,416 | 17,812 | 195,933 | 0.0076 | 35% |
| COMPONENT C-7 | 3180 | 1680 | 1650 | 32 | 144 | 50 | 160 | 150 | 160 | 1360 | 10,309 | 19,467 | 214,133 | 0.0086 | 55% |

Fig.6B

UNIT: μm

| COMPONENT NAME | MULTILAYER DESIGN | | |
|---|---|---|---|
| | BT THICKNESS t1 | ELECTRODE THICKNESS t2 | LAYER NUMBER |
| COMPONENT A | 1.9 | 0.8 | 300 |
| COMPONENT B | 2 | 0.8 | 424 |
| COMPONENT C-1 | 1.6 | 0.8 | 530 |
| COMPONENT C-2 | 1.6 | 0.8 | 530 |
| COMPONENT C-3 | 1.6 | 0.8 | 530 |
| COMPONENT C-4 | 1.6 | 0.8 | 530 |
| COMPONENT C-5 | 1.6 | 0.8 | 530 |
| COMPONENT C-6 | 1.6 | 0.8 | 530 |
| COMPONENT C-7 | 1.6 | 0.8 | 530 |

MULTILAYER CAPACITOR

CROSS REFERENCE TO RELATED APPLICATIONS

This application claims priority to Japanese Patent Application No. 2021-032743 filed on Mar. 2, 2021, the entire contents of which are incorporated by reference herein.

TECHNICAL FIELD

The present invention relates to a multilayer capacitor.

BACKGROUND

A multilayer capacitor has been known that includes an element body having a pair of end surfaces facing each other, and a pair of side surfaces and a pair of main surfaces located between the pair of end surfaces to extend in a length direction where the pair of end surfaces face each other; and a pair of external electrodes disposed on the pair of end surfaces (for example, refer to Japanese Unexamined Patent Publication No. 2003-318060). Such a multilayer capacitor includes an inner layer portion in which internal electrodes are stacked, and outer layer portions that interpose the inner layer portion therebetween.

SUMMARY

Here, in the above-described multilayer capacitor, the internal electrode of the inner layer portion may protrude outward in the length direction from the outer layer portion by a predetermined protrusion amount. Since there is a possibility that such a protrusion amount affects the performance of the multilayer capacitor, it is required to improve the performance of the multilayer capacitor by adjusting the protrusion amount within an appropriate range.

Therefore, an object of the present invention is to provide a multilayer capacitor of which the performance can be improved.

A multilayer capacitor includes an element body having a pair of end surfaces facing each other, and a pair of side surfaces and a pair of main surfaces located between the pair of end surfaces to extend in a first direction where the pair of end surfaces face each other; and a pair of external electrodes disposed on the pair of end surfaces. The element body includes an inner layer portion in which a plurality of internal electrodes and a plurality of dielectric layers are alternately stacked in a second direction where the pair of main surfaces face each other, and a pair of outer layer portions disposed outside the inner layer portion in the second direction. On at least one of the pair of end surfaces, the internal electrode of the inner layer portion protrudes outward in the first direction from the outer layer portion by a predetermined protrusion amount. A ratio of the protrusion amount to a dimension of one outer layer portion in the second direction ranges from 96,000 ppm to 176,000 ppm.

When the protrusion amount is too large, there is a high possibility of the generation of cracks, whereas when the protrusion amount is too small, there is a possibility that a variation in electrostatic capacitance is affected by poor contact between the internal electrode and the external electrode. On the other hand, as a result of earnest research, the inventors have reached that there is a correlation between the ratio of the protrusion amount to the dimension of one outer layer portion in the second direction and the performance of the multilayer capacitor, and have found an appropriate range. Specifically, cracks can be suppressed by setting the ratio of the protrusion amount to the dimension of one outer layer portion in the second direction to 176,000 ppm or less. In addition, a variation in electrostatic capacitance can be suppressed by setting the ratio of the protrusion amount to the dimension of one outer layer portion in the second direction to 96,000 ppm or more. As described above, the performance of the multilayer capacitor can be improved.

The ratio may be 165,000 ppm or less or may be 154,000 ppm or less. In this case, cracks can be further suppressed.

The ratio may be 121,000 or more or may be 137,000 ppm or more. In this case, a variation in electrostatic capacitance can be further reduced.

The internal electrode may include a main electrode portion forming an electrostatic capacitance, and a connecting portion that connects the main electrode portion and the external electrode, and a width dimension of the connecting portion may be smaller than a width dimension of the main electrode portion in a third direction where the pair of side surfaces face each other. In this case, the infiltration of a plating solution in the vicinity of the connecting portion can be suppressed, whereas cracks or a variation in electrostatic capacitance is likely to be generated. On the other hand, when the ratio is set within the above-described ranges, cracks or a variation in electrostatic capacitance can be suppressed while the infiltration of the plating solution is suppressed.

The present invention can provide the multilayer capacitor of which the performance can be improved.

DETAILED DESCRIPTION

Hereinafter, an embodiment of the present invention will be described in detail with reference to the accompanying drawings. Incidentally, in the description, the same components or components having the same function are denoted by the same reference signs, and duplicated descriptions will be omitted.

Figure 1:
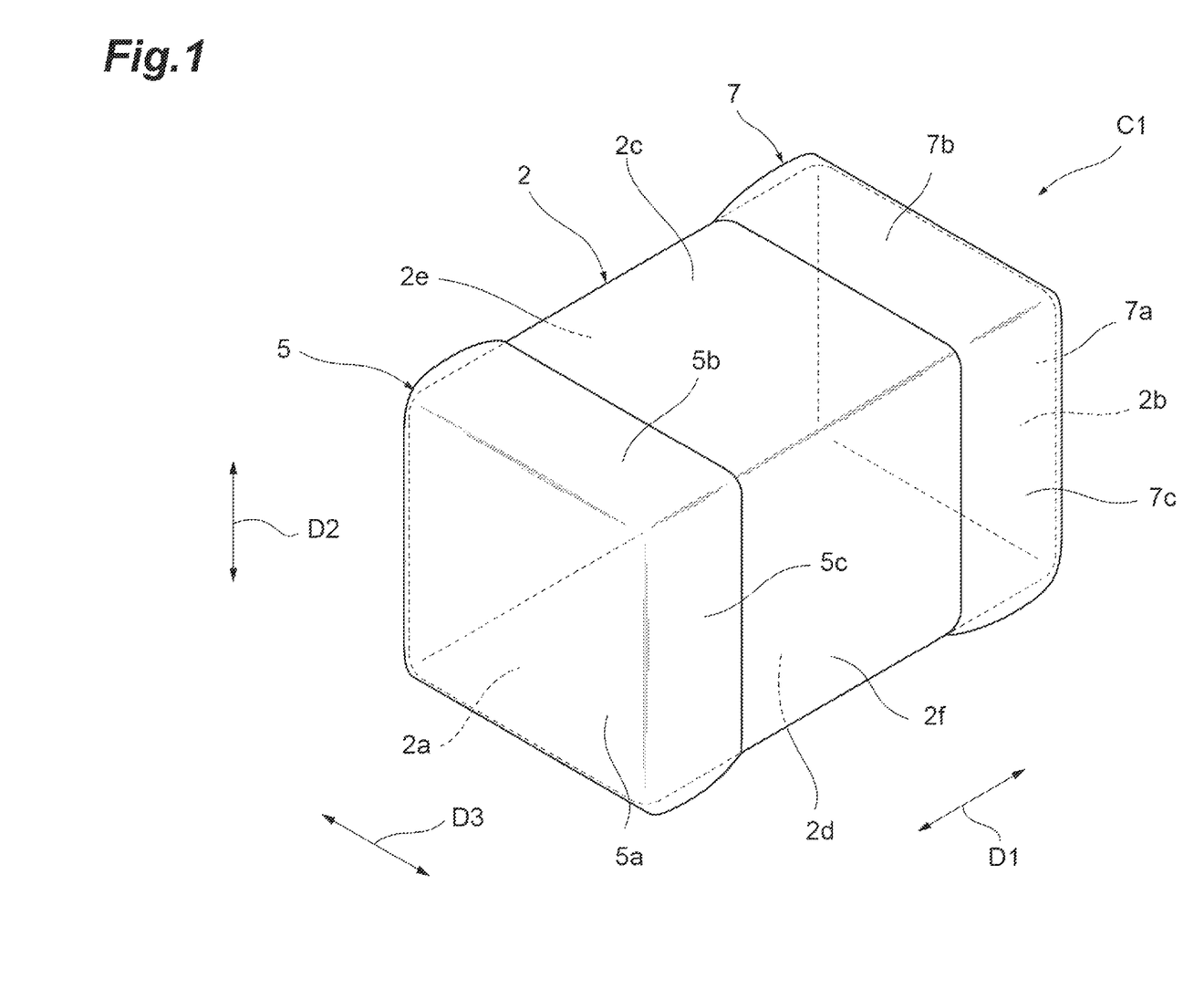
FIG. 1 is a perspective view illustrating a multilayer capacitor according to one embodiment of the present invention.
Figure 2:
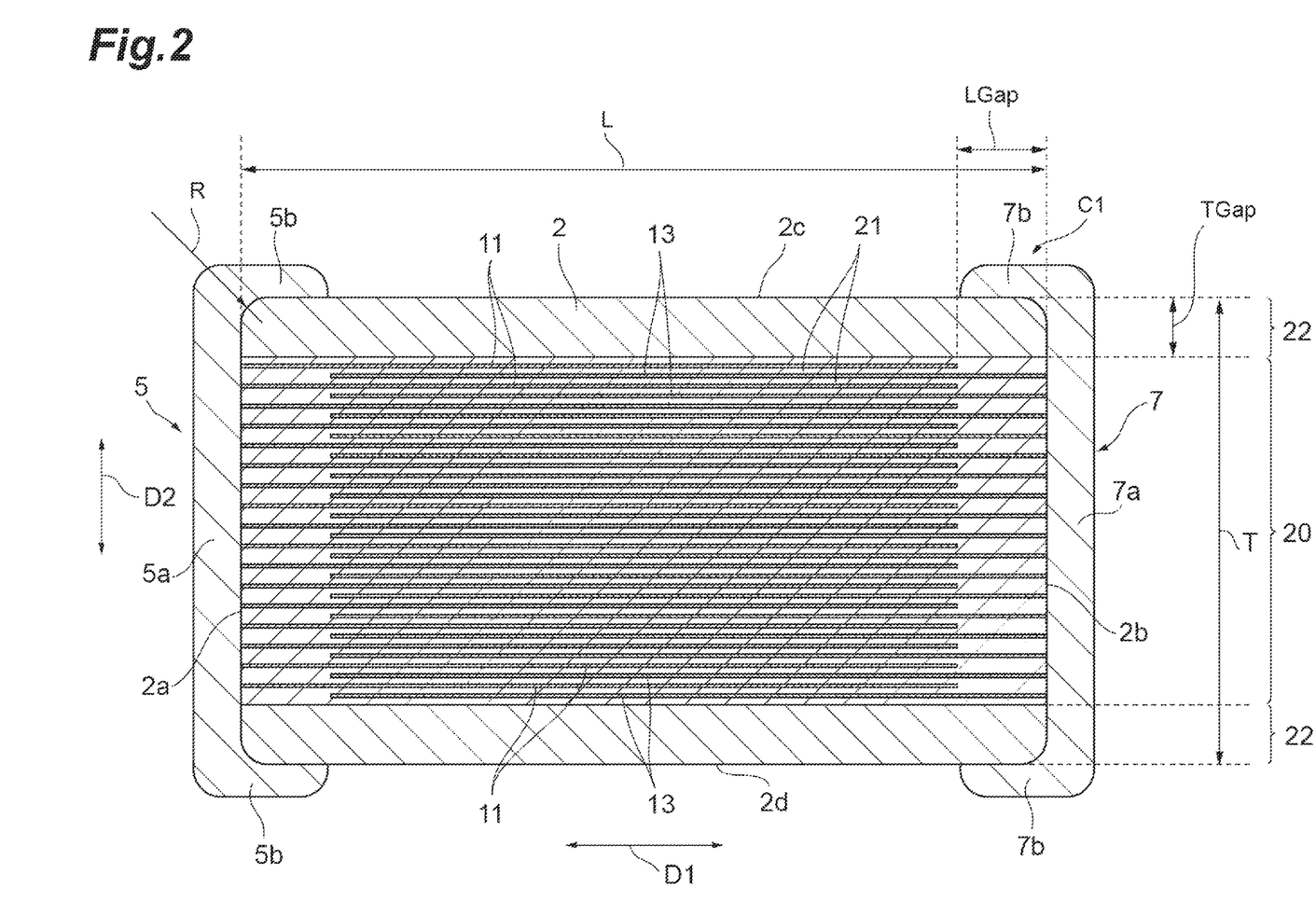
FIG. 2 is a view for describing a cross-sectional configuration of the multilayer capacitor according to the present embodiment.
Figure 3:
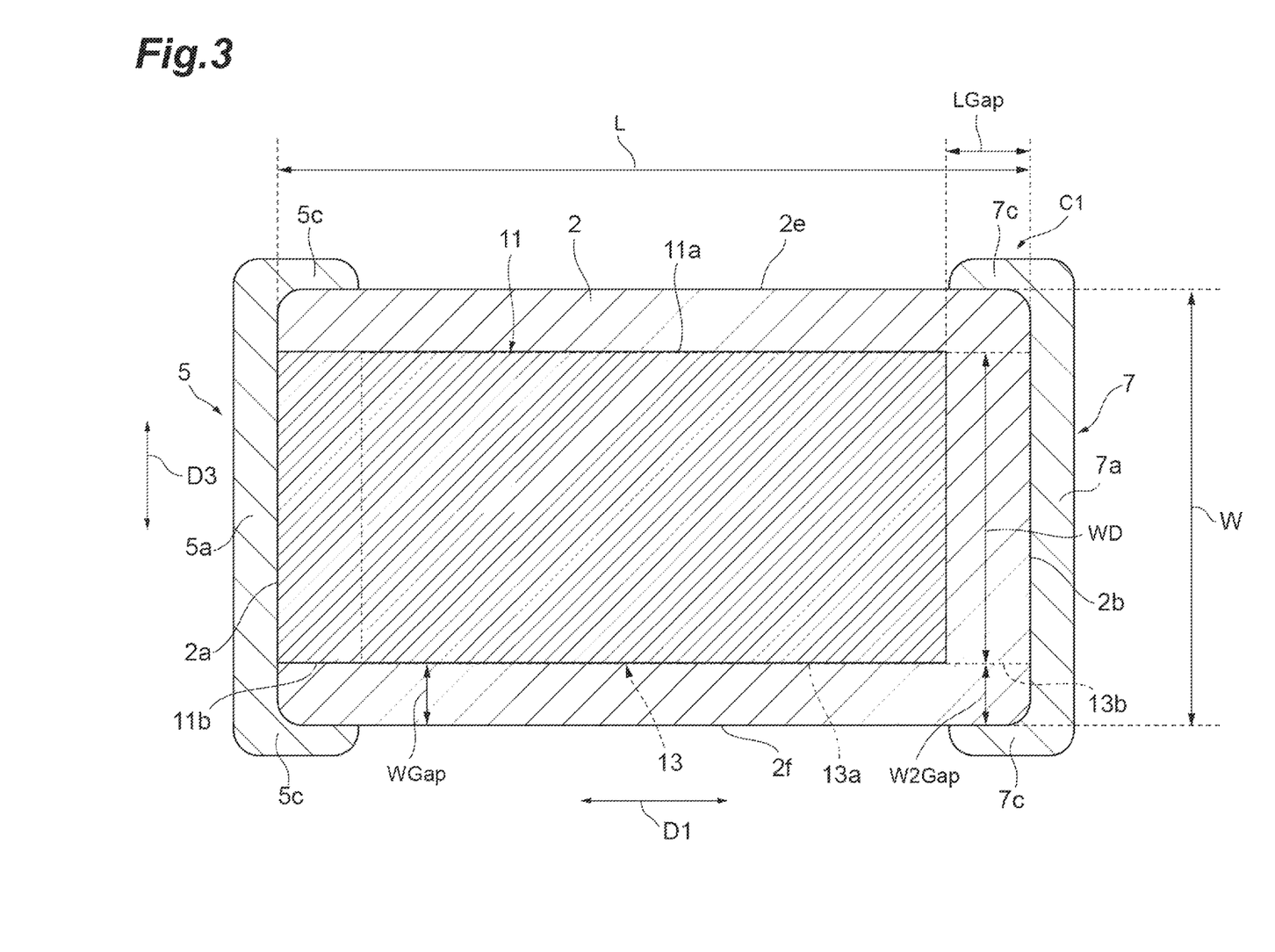
FIG. 3 is a view for describing a cross-sectional configuration of the multilayer capacitor according to the present embodiment.

A configuration of a multilayer capacitor C1 according to the present embodiment will be described with reference to FIGS. 1 to 3. FIG. 1 is a perspective view illustrating the multilayer capacitor according to the present embodiment. FIGS. 2 and 3 are views for describing cross-sectional configurations of the multilayer capacitor according to the present embodiment. In the present embodiment, the multilayer capacitor C1 will be described as an example of an electronic component.

As illustrated in FIG. 1, the multilayer capacitor C1 includes an element body 2 having a rectangular parallelepiped shape, and an external electrode 5 and an external electrode 7 disposed on outer surfaces of the element body 2. The external electrode 5 and the external electrode 7 are separated from each other. The rectangular parallelepiped shape includes a rectangular parallelepiped shape of which corners and ridge line portions are chamfered, and a rectangular parallelepiped shape of which corners and ridge line portions are rounded. The external electrodes 5 and 7 are also terminal electrodes.

The element body 2 has a pair of end surfaces 2a and 2b facing each other, a pair of main surfaces 2c and 2d facing each other, and a pair of side surfaces 2e and 2f facing each other, as outer surfaces of the element body 2. In the present embodiment, a direction where the pair of end surfaces 2a and 2b face each other (first direction D1) is a length direction of the element body 2, a direction where the pair of main surfaces 2c and 2d face each other (second direction D2) is a height direction of the element body 2, and a direction where the pair of side surfaces 2e and 2f face each other (third direction D3) is a width direction of the element body 2.

A length of the element body 2 in the first direction D1 is larger than a length of the element body 2 in the second direction D2 and a length of the element body 2 in the third direction D3. The length of the element body 2 in the second direction D2 and the length of the element body 2 in the third direction D3 are equal. Namely, in the present embodiment, the pair of end surfaces 2a and 2b have a square shape, and the pair of main surfaces 2c and 2d and the pair of side surfaces 2e and 2f have a rectangular shape. The length of the element body 2 in the first direction D1 may be equal to the length of the element body 2 in the second direction D2 and to the length of the element body 2 in the third direction D3. The length of the element body 2 in the second direction D2 may be different from the length of the element body 2 in the third direction D3.

As for being equal, in addition to being exactly equal, values including a slight difference, a production error or the like within a range set in advance may be regarded as being equal. For example, when a plurality of values are included within a range of ±5% of an average value of the plurality of values, the plurality of values are specified as being equal.

The pair of main surfaces 2c and 2d extend in the first direction D1 to connect the pair of end surfaces 2a and 2b. The pair of main surfaces 2c and 2d also extend in the third direction D3. The pair of side surfaces 2e and 2f extend in the first direction D1 to connect the pair of end surfaces 2a and 2b. The pair of side surfaces 2e and 2f also extend in the second direction D2.

The element body 2 is configured by stacking a plurality of dielectric layers 21 in the direction where the pair of main surfaces 2c and 2d face each other (second direction D2). In the element body 2, a stacking direction of the plurality of dielectric layers 21 (hereinafter, simply referred to as a "stacking direction") coincides with the second direction D2. Each of the dielectric layers 21 is made of, for example, a sintered body of ceramic green sheets containing a dielectric material ($BaTiO_3$-based, $Ba(Ti, Zr)O_3$-based, or $(Ba, Ca)TiO_3$-based dielectric ceramic). In the actual element body 2, the dielectric layers 21 are integrated to such an extent that a boundary between the dielectric layers 21 cannot be visually recognized. The third direction D3 may be the stacking direction.

Accordingly, the element body 2 includes an inner layer portion 20 in which a plurality of internal electrodes 11, a plurality of internal electrodes 13, and the plurality of dielectric layers 21 are stacked with each other in the second direction D2. In addition, the element body 2 includes a pair of outer layer portions 22 disposed outside the inner layer portion 20 in the second direction D2. Accordingly, the inner layer portion 20 is interposed between the pair of outer layer portions 22 in the second direction D2. Incidentally, a material forming the outer layer portion 22 may be different from a material forming the inner layer portion 20. In the case of being different, the generation of cracks by a difference in thermal shrinkage rate between the inner layer portion 20 and the outer layer portion 22 can be suppressed in the present embodiment, so that the effect becomes remarkable. Alternatively, the outer layer portion 22 may be made of the same material as that of the inner layer portion 20. Even when the materials of the outer layer portion 22 and the inner layer portion 20 are the same, a structure such as a thickness of the sheet or the presence or absence of the electrodes may contribute to the difference in shrinkage rate between the outer layer portion 22 and the inner layer portion 20.

As illustrated in FIGS. 2 and 3, the multilayer capacitor C1 includes the plurality of internal electrodes 11 and the plurality of internal electrodes 13. The internal electrodes 11 and 13 are made of a conductive material (for example, Ni, Cu or the like) that is usually used as an internal conductor of a multilayer electronic component. The internal electrodes 11 and 13 are formed as a sintered body of a conductive paste containing the above conductive material. The internal electrodes 11 and 13 function as internal conductors that are disposed inside the element body 2.

The internal electrode 11 and the internal electrode 13 are disposed at different positions (layers) in the second direction D2. Namely, the internal electrodes 11 and the internal electrodes 13 are alternately disposed to face each other at intervals in the second direction D2 inside the element body 2. The internal electrode 11 and the internal electrode 13 have different polarities.

As illustrated in FIG. 3, each of the internal electrodes 11 includes a main electrode portion 11a and a connecting portion 11b. The main electrode portion 11a is a portion that faces a main electrode portion 13a of the internal electrode 13 to be described later to form an electrostatic capacitance. The connecting portion 11b is a portion that connects the main electrode portion 11a and the external electrode 5. The connecting portion 11b extends from one side (one short side) of the main electrode portion 11a to be exposed on the end surface 2a. The internal electrode 11 is exposed on the end surface 2a, but is not exposed on the end surface 2b, the pair of main surfaces 2c and 2d, and the pair of side surfaces 2e and 2f. The main electrode portion 11a and the connecting portion 11b are integrally formed.

The main electrode portion 11a has a rectangular shape having the first direction D1 as a long side direction and having the third direction D3 as a short side direction. Namely, the main electrode portion 11a of each of the internal electrodes 11 has a larger length in the first direction D1 than a length in the third direction D3. The connecting portion 11b extends from an end portion on an end surface 2a side of the main electrode portion 11a to the end surface 2a. A length of the connecting portion 11b in the first direction D1 is smaller than a length of the main electrode portion 11a in the first direction D1. A length of the connecting portion 11b in the third direction D3 is equal to a length of the main electrode portion 11a in the third direction D3. The connecting portion 11b is connected to the external electrode 5 at an end portion exposed on the end surface 2a. The length of the connecting portion 11b in the third direction D3 may be smaller than the length of the main electrode portion 11a in the third direction D3.

As illustrated in FIG. 3, each of the internal electrodes 13 includes the main electrode portion 13a and a connecting portion 13b. The main electrode portion 13a is a portion that faces the main electrode portion 11a of the internal electrode 11 to be described later to form an electrostatic capacitance. The connecting portion 13b is a portion that connects the main electrode portion 13a and the external electrode 7. The main electrode portion 13a faces the main electrode portion 11a in the second direction D2 with a part of the element body 2 (dielectric layer) therebetween. The connecting portion 13b extends from one side (one short side) of the main electrode portion 13a to be exposed on the end surface 2b. The internal electrode 13 is exposed on the end surface 2b, but is not exposed on the end surface 2a, the pair of main surfaces 2c and 2d, and the pair of side surfaces 2e and 2f. The main electrode portion 13a and the connecting portion 13b are integrally formed.

The main electrode portion 13a has a rectangular shape having the first direction D1 as a long side direction and having the third direction D3 as a short side direction. Namely, the main electrode portion 13a of each of the internal electrodes 13 has a larger length in the first direction D1 than a length in the third direction D3. The connecting portion 13b extends from an end portion on an end surface 2b side of the main electrode portion 13a to the end surface 2b. A length of the connecting portion 13b in the first direction D1 is smaller than a length of the main electrode portion 13a in the first direction D1. A length of the connecting portion 13b in the third direction D3 is equal to a length of the main electrode portion 13a in the third direction D3. The connecting portion 13b is connected to the external electrode 7 at an end portion exposed on the end surface 2b. The length of the connecting portion 13b in the third direction D3 may be smaller than the length of the main electrode portion 13a in the third direction D3.

Figure 4:
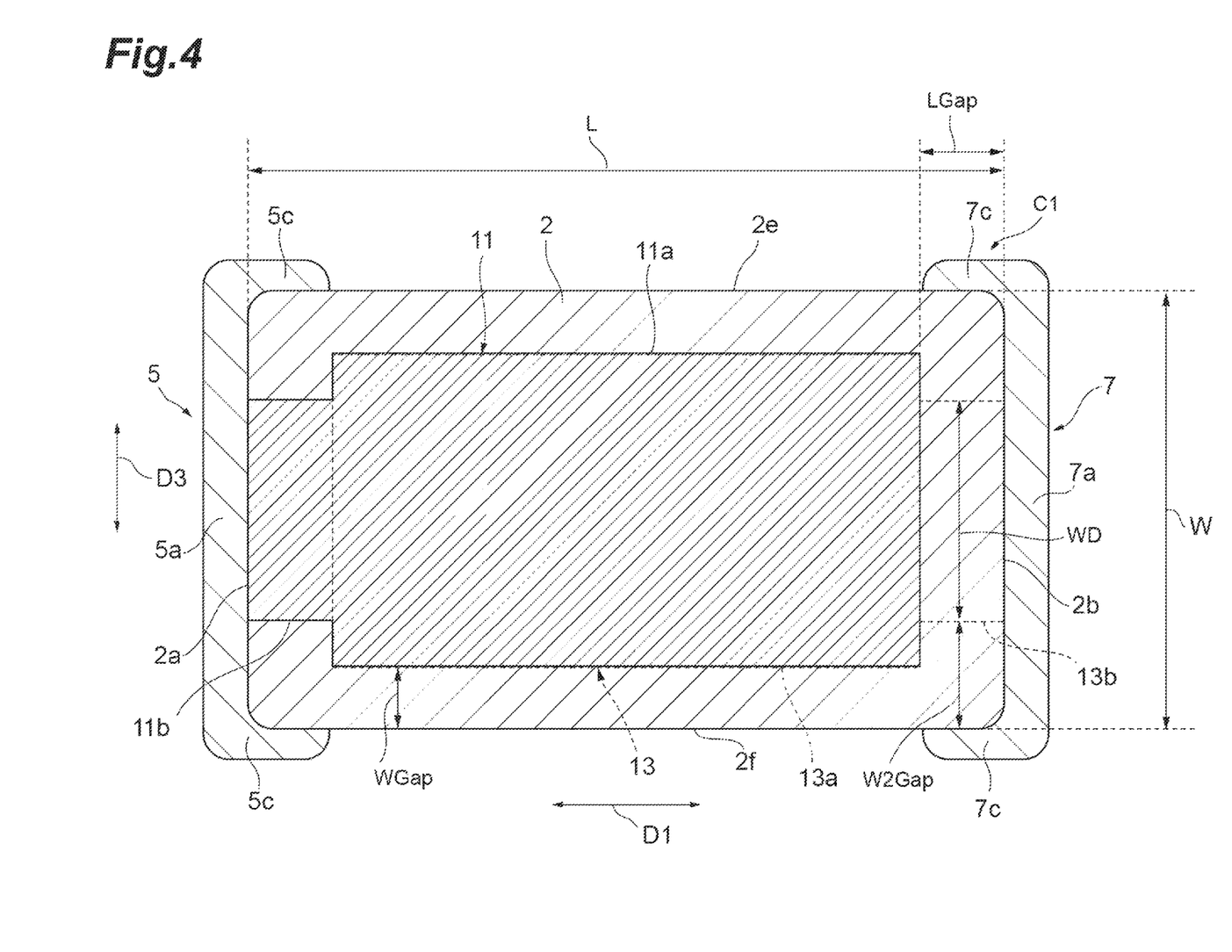
FIG. 4 is a view for describing a cross-sectional configuration of the multilayer capacitor according to the present embodiment.

Incidentally, the internal electrodes 11 and 13 may have the shape illustrated in FIG. 4. The internal electrodes 11 and 13 illustrated in FIG. 4 have a shape in which the connecting portions 11b and 13b are narrowed with respect to the main electrode portions 11a and 13a. Accordingly, a width dimension of the connecting portion 11b is smaller than a width dimension of the main electrode portion 11a in the third direction D3. A width dimension of the connecting portion 13b is smaller than a width dimension of the main electrode portion 13a in the third direction D3.

The external electrode 5 is located at an end portion on the end surface 2a side of the element body 2 when viewed in the first direction D1. The external electrode 5 includes an electrode portion 5a located on the end surface 2a; an electrode portion 5b located on the pair of main surfaces 2c and 2d; and an electrode portion 5c located on the pair of side surfaces 2e and 2f. Namely, the external electrode 5 is formed on five surfaces 2a, 2c, 2d, 2e, and 2f.

The electrode portions 5a, 5b, and 5c adjacent to each other are connected to each other at ridge line portions of the element body 2, and are electrically connected to each other. The electrode portion 5a and the electrode portion 5b are connected to each other at the ridge line portion between the end surface 2a and each of the main surfaces 2c and 2d. The electrode portion 5a and the electrode portion 5c are connected to each other at the ridge line portion between the end surface 2a and each of the side surfaces 2e and 2f.

The electrode portion 5a is disposed to cover all portions of the connecting portions 11b which are exposed on the end surface 2a, and the connecting portions 11b are directly connected to the external electrode 5. Namely, the connecting portions 11b connect the main electrode portions 11a and the electrode portion 5c. Accordingly, each of the internal electrodes 11 is electrically connected to the external electrode 5.

The external electrode 7 is located at an end portion on the end surface 2b side of the element body 2 when viewed in the first direction D1. The external electrode 7 includes an electrode portion 7a located on the end surface 2b; an electrode portion 7b located on the pair of main surfaces 2c and 2d; and an electrode portion 7c located on the pair of side surfaces 2e and 2f. Namely, the external electrode 7 is formed on five surfaces 2b, 2c, 2d, 2e, and 2f.

The electrode portions 7a, 7b, and 7c adjacent to each other are connected to each other at ridge line portions of the element body 2, and are electrically connected to each other. The electrode portion 7a and the electrode portion 7b are connected to each other at the ridge line portion between the end surface 2b and each of the main surfaces 2c and 2d. The electrode portion 7a and the electrode portion 7c are connected to each other at the ridge line portion between the end surface 2b and each of the side surfaces 2e and 2f.

The electrode portion 7a is disposed to cover all portions of the connecting portions 13b which are exposed on the end surface 2b, and the connecting portions 13b are directly connected to the external electrode 7. Namely, the connecting portions 13b connect the main electrode portions 13a and the electrode portion 7c. Accordingly, each of the internal electrodes 13 is electrically connected to the external electrode 7.

Figure 5:
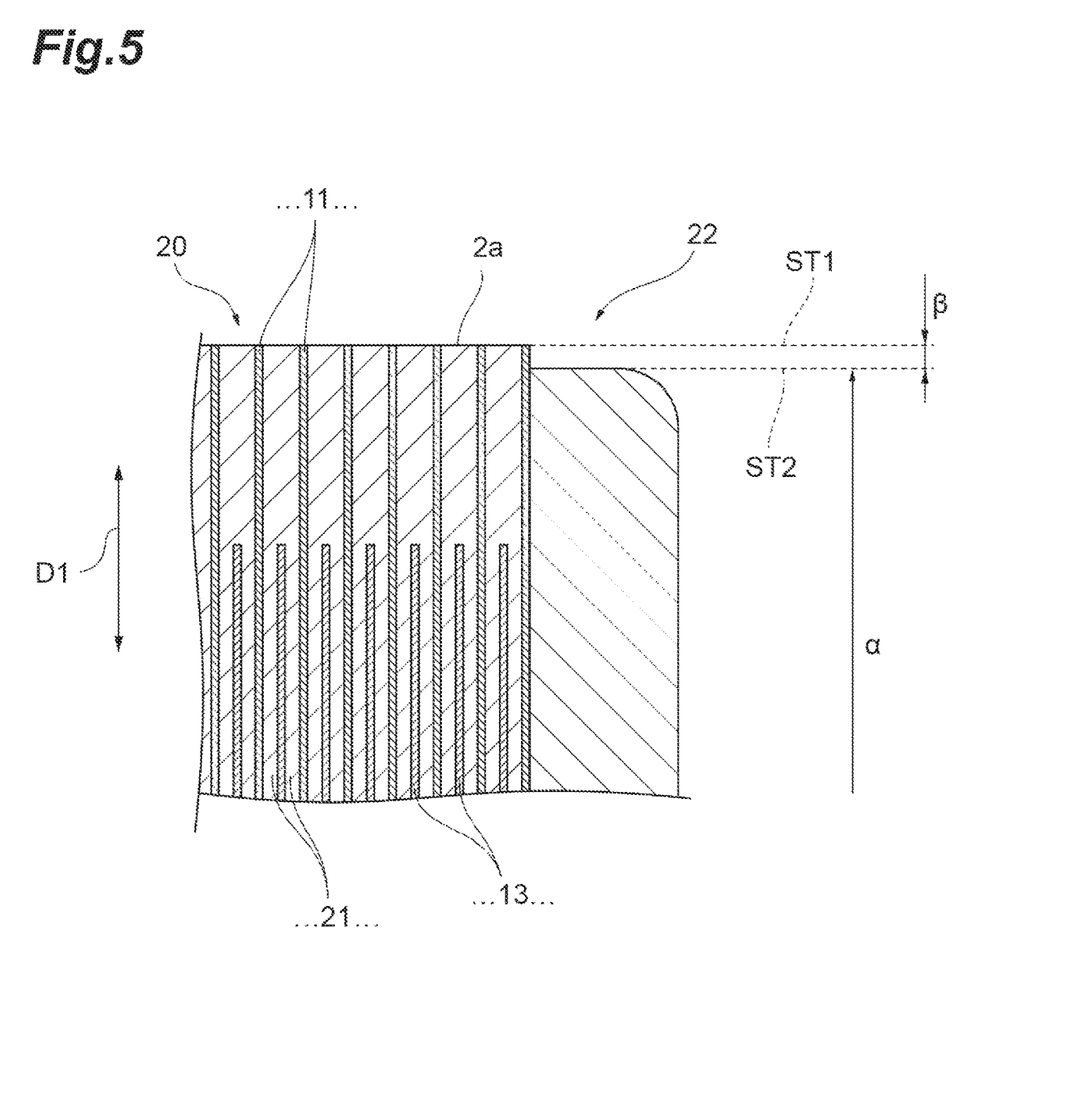
FIG. 5 is an enlarged cross-sectional view of the vicinity of an end surface.

FIG. 5 is an enlarged cross-sectional view of the vicinity of the end surface 2a. Incidentally, FIG. 5 illustrates only one end surface 2a, but the following description is also valid for the other end surface 2b. As illustrated in FIG. 5, the internal electrode 11 of the inner layer portion 20 protrudes outward in the first direction from the outer layer portion 22 by a predetermined protrusion amount β. Incidentally, when reference lines ST1 and ST2 that determine the protrusion amount β are set, the reference line ST1 is set at an outermost portion of the end surface 2a on an inner layer portion 20 side in the first direction D1. In addition, the reference line ST2 is set at an outermost portion of the end surface 2a on a pair of outer layer portions 22 side in the first direction D1. Incidentally, a length of the outer layer portion 22 in the first direction D1 is indicated by a dimension α. The dimension α is substantially the same as a dimension L to be described later.

Next, a dimensional relationship of the multilayer capacitor C1 will be described. As illustrated in FIG. 2, the length of the element body 2 in the first direction D1 is defined as a dimension L1. A size of a gap in the first direction D1 between the internal electrode 11 and the end surface 2b, and a size of a gap in the first direction D1 between the internal electrode 13 and the end surface 2a are defined as a dimension LGap. The dimension L may be set to a range of 370 to 6,100 μm and preferably to a range of 1,450 to 3,600 μm. Incidentally, the dimension L is a dimension in reference to outermost portions of the end surfaces 2a and 2b in the first direction D1. The dimension LGap may be set to a range of 30 to 280 μm and preferably to a range of 100 to 200 μm. Incidentally, a dimension R that is a radius of curvature of rounding of each corner of the element body 2 may be set to a range of 10 to 350 μm and preferably to a range of 75 to 200 μm.

A height of the element body 2 in the second direction D2 is defined as a dimension T. A size of a gap in the second direction D2 between the inner layer portion 20 and each of the main surfaces 2c and 2d, namely, a thickness of the outer layer portion 22 in the second direction D2 is defined as a dimension TGap. The dimension may be set to a range of 170 to 3,100 μm and preferably to a range of 600 to 2,900 μm. The dimension TGap may be set to a range of 20 to 240 μm and preferably to a range of 90 to 200 μm.

As illustrated in FIG. 3, a width of the element body 2 in the third direction D3 is defined as a dimension W. A size of a gap in the third direction D3 between the main electrode portions 11a and 13a of the internal electrodes 11 and 13 and the side surfaces 2e and 2f is defined as a dimension WGap. A size of a gap in the third direction D3 between the connecting portions 11b and 13b of the internal electrodes 11 and 13 and the side surfaces 2e and 2f is defined as a dimension W2Gap. Incidentally, a width of each of the connecting portions 11b and 13b is defined as a dimension WD. The dimension W may be set to a range of 170 to 5,400 μm and preferably to a range of 600 to 2,900 μm. The dimension WGap may be set to a range of 30 to 280 μm and preferably to a range of 100 to 200 μm. The dimension W2Gap may be set to a range of 30 to 700 μm and preferably to a range of 230 to 560 μm.

As illustrated in FIG. 4, a thickness of the dielectric layer 21 is defined as a dimension t1, and a thickness of each of the internal electrodes 11 and 13 is defined as a dimension t2. The dimension t1 may be set to a range of 0.6 to 6.5 μm and preferably to a range of 1.6 to 2.2 μm. The dimension t2 may be set to a range of 0.6 to 1.2 μm and preferably to a range of 0.8 to 1.0 μm.

Next, a magnitude of the protrusion amount β of the inner layer portion 20 will be described. The magnitude of the protrusion amount β is affected by an overall size of the multilayer capacitor C1 and the like. Therefore, here, a preferable range of the protrusion amount β will be described using a ratio of the protrusion amount β to a dimension of a predetermined portion of the multilayer capacitor C1. In addition, the range of the ratio of the protrusion amount β is set to a range where the generation of thermal cracks in a base material of the element body 2 can be suppressed and a variation in electrostatic capacitance can be suppressed. In the multilayer capacitor C1, a desired protrusion amount β can be obtained by adjusting, firing conditions such as a maximum temperature during firing, the thickness of the internal electrodes 11 and 13, or the like. Therefore, even when the multilayer capacitors C1 have the same shape and size, samples having different protrusion amounts β can be fabricated by changing firing conditions, the thickness of the internal electrodes 11 and 13, or the like.

Figure 6A:
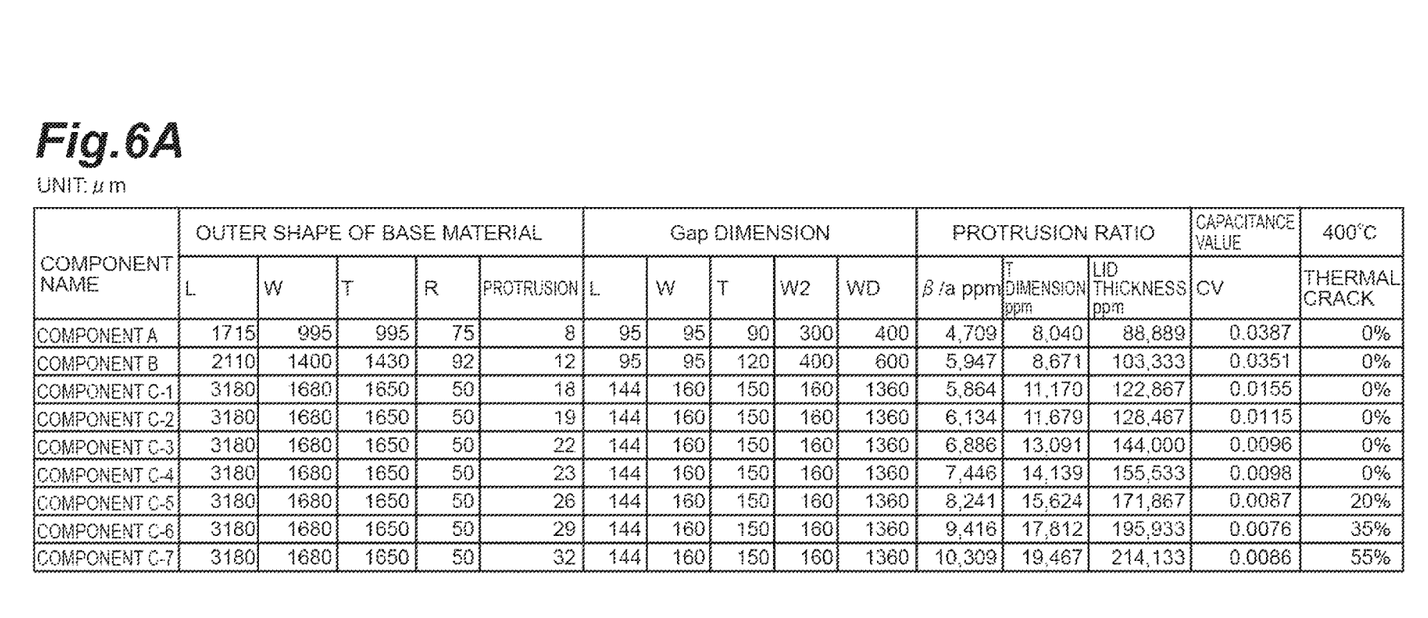
FIGS. 6A and 6B are tables showing experimental conditions and measurement results.
Figure 6B:
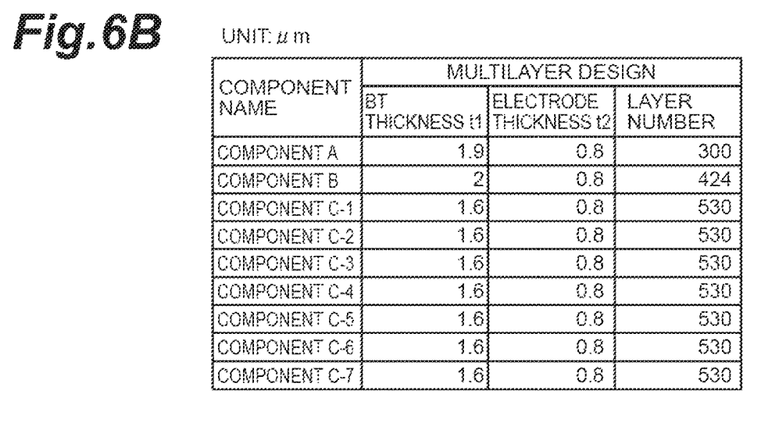

In the specification, generation of thermal cracks was evaluated as follows. A plurality (for example, 20) of samples of the multilayer capacitors C1 having the same shape and size and having the same protrusion amount β were prepared. Then, each sample was immersed in a solder bath at 400° C. for 3 seconds, and was taken out. Then, a test of resistance against cracks caused by thermal stress was performed. Each sample was observed after the test to evaluate a ratio of the number of the samples having thermal cracks to the total number. In FIGS. 6A and 6B, the ratio is indicated by % in a "thermal crack" item, and FIGS. 7 and 8, the ratio is indicated by "base material thermal crack %".

Incidentally, a method for evaluating thermal cracks is not necessarily limited to the above-described method.

In the specification, a variation in electrostatic capacitance was evaluated as follows. A plurality (for example, 10) of samples of the multilayer capacitors C1 having the same shape and size and having the same protrusion amount β were prepared. Then, each sample was measured for electrostatic capacitance. After the electrostatic capacitances of all the samples were acquired, an average value was calculated. Then, a CV value was calculated by dividing a standard deviation by the average value, and the CV value was evaluated as a variation. In FIGS. 6A and 6B, the value is shown in a "capacitance value" item, and in FIGS. 7 and 8, the value is indicated by "electrostatic capacitance CV". Incidentally, a method for evaluating a variation in electrostatic capacitance is not necessarily limited to the above-described method.

Figure 7:
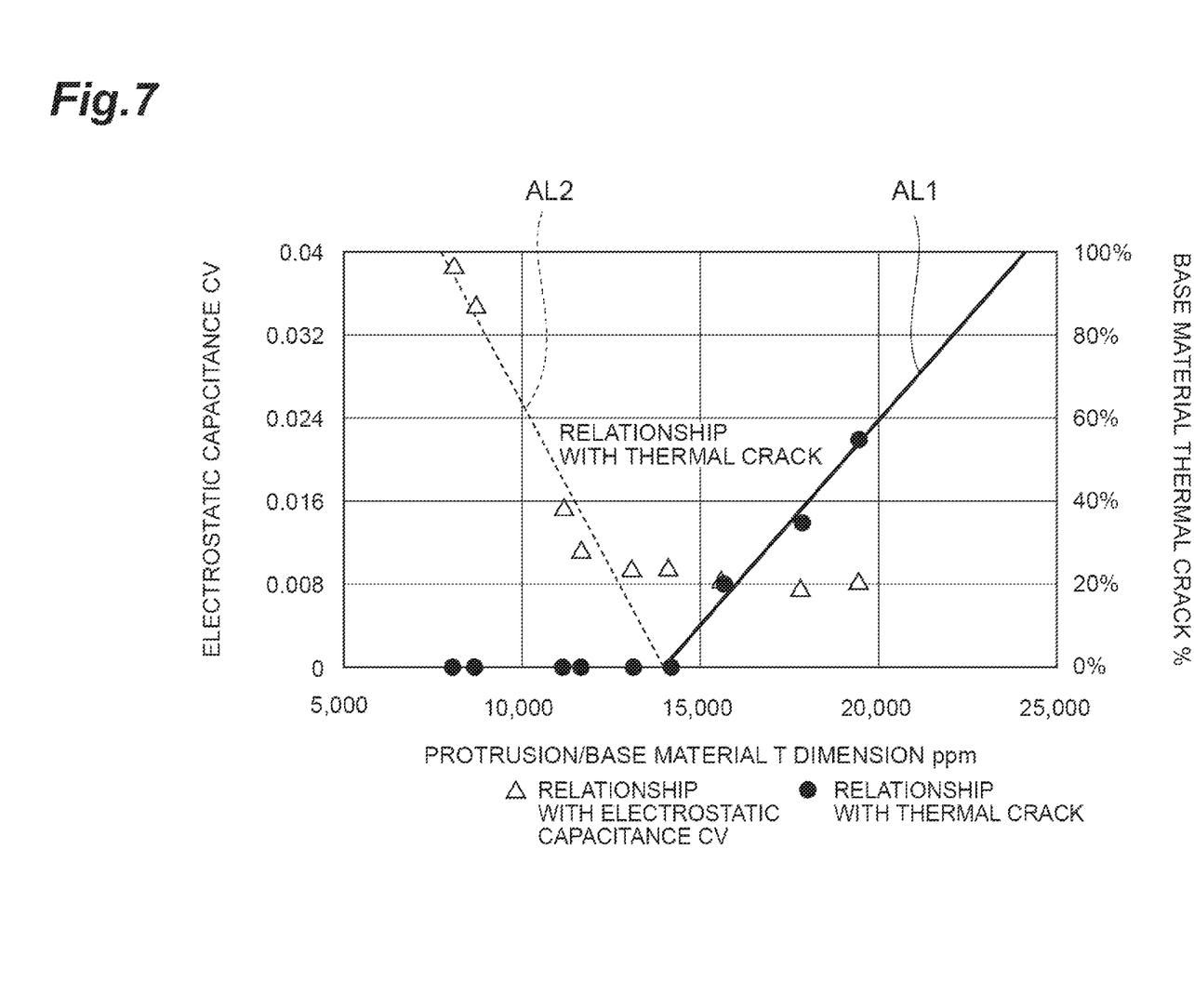
FIG. 7 is a graph illustrating measurement results.

Specifically, here, as a result of earnest research, the inventors have found that a predetermined relationship is established between a ratio of the protrusion amount β to the dimension T of the element body 2 in the second direction D2 (hereinafter, may be referred to as a "T ratio"), and the generation of thermal cracks. Incidentally, the T ratio is a value obtained by a calculation formula such as "protrusion amount β/T dimension". Specifically, as illustrated in FIG. 7, the base material thermal crack is suppressed to 0% in a region where the T ratio is small. In addition, the ratio of the base material thermal crack increases proportionally as the T ratio increases along a predetermined approximate line AL1 in a region where the T ratio is large. The variation in electrostatic capacitance decreases as the T ratio increases along a predetermined approximate line AL2 in a region where the T ratio is small. In addition, the variation in electrostatic capacitance converges to a predetermined value (vicinity of 0.008 CV in FIG. 7) in a region where the T ratio is large, and is suppressed to the vicinity of the value.

Figure 8:
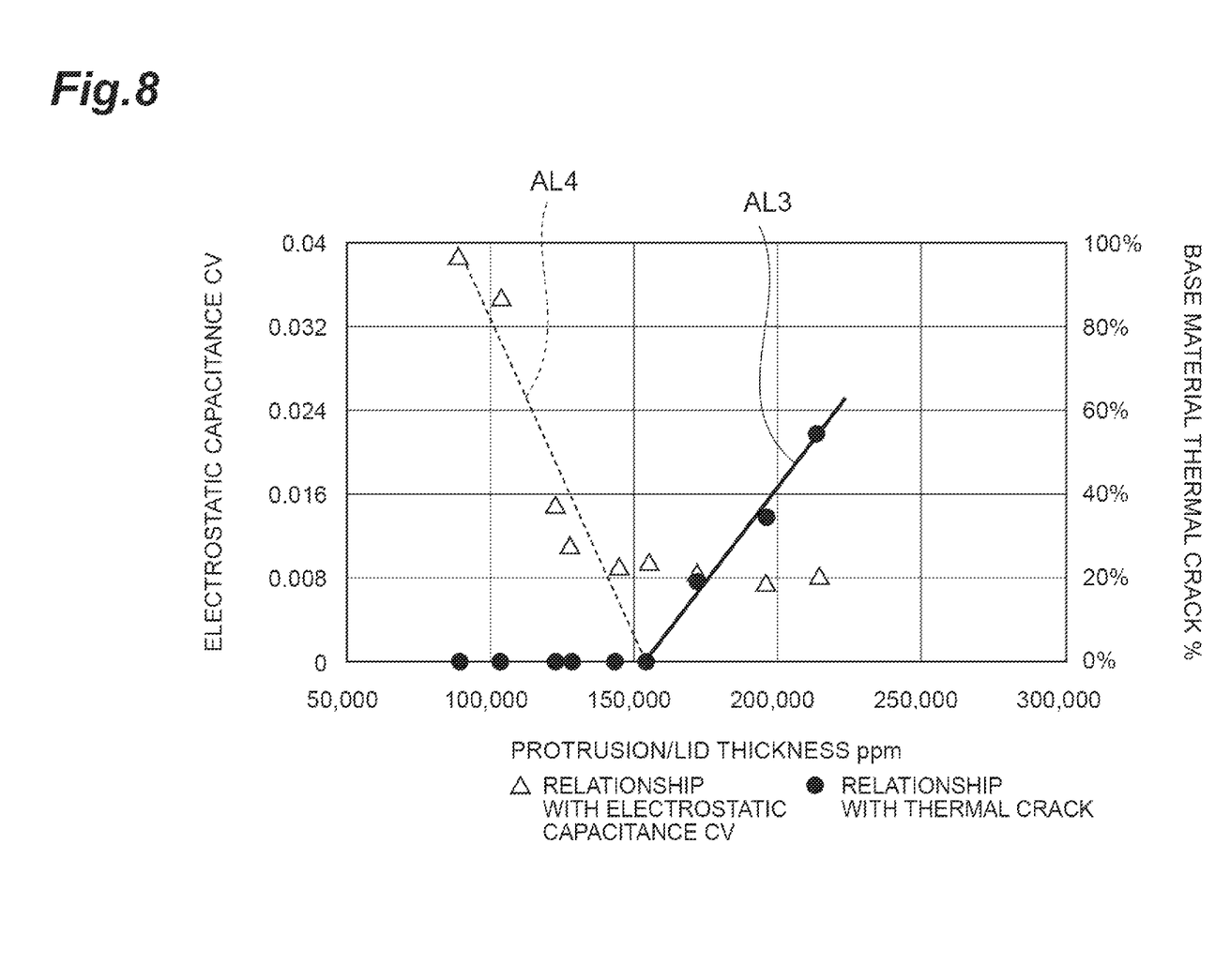
FIG. 8 is a graph illustrating measurement results.

Further, as a result of earnest research, the inventors have found that a predetermined relationship is established between a ratio of the protrusion amount β to the dimension TGap of one outer layer portion 22 in the second direction D2 (hereinafter, may be referred to as a "TGap ratio"), and the generation of thermal cracks. Incidentally, the TGap ratio is a value obtained by a calculation formula such as "protrusion amount β/TGap dimension". Specifically, as illustrated in FIG. 8, the base material thermal crack is suppressed to 0% in a region where the TGap ratio is small. In addition, the ratio of the base material thermal crack increases proportionally as the TGap ratio increases along a predetermined approximate line AL3 in a region where the TGap ratio is large. The variation in electrostatic capacitance decreases as the TGap ratio increases along a predetermined approximate line AL4 in a region where the TGap ratio is small. In addition, the variation in electrostatic capacitance converges to a predetermined value (vicinity of 0.008 CV in FIG. 8 in a region where the TGap ratio is large, and is suppressed to the vicinity of the value.

FIGS. 7 and 8 are graphs obtained by performing experiments according to experimental conditions shown in FIGS. 6A and 6B. Incidentally, conditions of the multilayer capacitor C1 are not limited to those shown in FIGS. 6A and 6B. Namely, since the numerical value ranges described in the specification are specified not by absolute values of the protrusion amount β but by the ratio of the protrusion amount β, even when the conditions of the multilayer capacitor are changed, the same relationships are established. In the experiments shown in FIGS. 6A and 6B, as for components A and B, the protrusion amount β was set to values shown in a "protrusion" item of FIG. 6A. Incidentally, the values of the above-described "LGap" are shown in an "L" item of a "Gap dimension" column. The same applies to other items. In addition, as for a component C, seven types of multilayer capacitors having the shape and size, but having different protrusion amounts β were prepared (components C-1 to C-7). The T ratio was calculated from these conditions, and were shown in a "T dimension ppm" item of a "protrusion ratio" column. In addition, the TGap ratio was calculated and shown in a "lid thickness ppm" item of the "protrusion ratio" column. Incidentally, a ratio of the protrusion amount β to the dimension α of the length of the outer layer portion 22 in the first direction D1 was shown in a "β/α ppm" item. A large number of the components A, B, and C-1 to C-7 set to these experimental conditions were prepared and measured for base material thermal cracks and a variation in electrostatic capacitance by the above-described method. Measurement results of a variation in electrostatic capacitance were shown in a "capacitance value/CV" item, and measurement results of base material thermal crack were shown in a "400° C./thermal crack" item. Incidentally, in FIG. 6B, the dimension t1 of the thickness of the dielectric layer 21 was shown in "BT thickness t1", the dimension t2 of the thickness of the internal electrodes 11 and 13 was shown in "electrode thickness t2", and the layer numbers of the internal electrodes 11 and 13 were shown in a "layer number" item. Incidentally, barium titanate, calcium titanate, strontium titanate, or the like is adopted as a main component of a material of the dielectric layer 21 of the inner layer portion 20 of each component, and barium titanate, calcium titanate, strontium titanate, or the like is adopted as a main component of a. material of the outer layer portion 22.

Specifically, the T ratio ranges preferably from 11,000 ppm to 16,000 ppm. Further, the T ratio is more preferably 15,000 ppm or less and further preferably 14,000 ppm or less. In addition, the T ratio is more preferably 12,000 ppm or more and further preferably 12,500 ppm or more.

In the multilayer capacitor C1, it is preferable that the generation of base material thermal cracks is suppressed to 20% or less. In this regard, the generation of base material thermal cracks can be suppressed to 20% or less by setting the T ratio to 16,000 ppm or less. For example, in the example illustrated in FIG. 7, a measure scale of 20% is illustrated, and the 20% line and the approximate line AL1 intersect with each other at a T ratio of approximately 16,000 ppm. Here, since the approximate line AL1 is a straight line that is set from a plot of experiment results using a known an approximation method (here, the least squares method), the approximate line AL1 includes an error. In addition, the position of the approximate line AL1 may be slightly changed depending on the approximation method. Therefore, in a range of ±4% from an intersection between approximate line AL1 and an evaluation value line (here, 20% line) set on the vertical axis, the experiment results can be substantially regarded as being on the evaluation line in evaluation considering an error. Incidentally, since the same description of dealing with an error with respect to such an intersection is valid for the following numerical value ranges, a description will be omitted. For this reason, it is confirmed that the generation of base material thermal cracks can be suppressed to 20% or less by setting the T ratio to 16,000 ppm or less.

In the multilayer capacitor C1, it is more preferable that the generation of base material thermal cracks is suppressed to 10% or less. In this regard, the generation of base material thermal cracks can be suppressed to 10% or less by setting the T ratio to 15,000 ppm or less. For example, in the example illustrated in FIG. 7, it is confirmed that the generation of base material thermal cracks is suppressed to 10% or less by setting the T ratio to 15,000 ppm or less in consideration of a position of 10% on the approximate line AL1, the above-described error of the approximate line, and the like.

In the multilayer capacitor C1, it is more preferable that the generation of base material thermal cracks is suppressed to 0%. In this regard, the generation of base material thermal cracks can be suppressed to 0% by setting the T ratio to 14,000 ppm or less. For example, in the example illustrated in FIG. 7, it is confirmed that the generation of base material thermal cracks is suppressed to 0% by setting the T ratio to 14,000 ppm or less in consideration of a position of 0% on the approximate line AL1, the above-described error of the approximate line, and the like.

In the multilayer capacitor C1, it is preferable that a variation in electrostatic capacitance is suppressed to 0.02 CV or less. In this regard, the variation in electrostatic capacitance can be suppressed to 0.02 CV or less by setting the T ratio to 11,000 ppm or more. For example, in the example illustrated in FIG. 7, it is confirmed that the variation in electrostatic capacitance is suppressed to 0.02 CV or less by setting the T ratio to 11,000 ppm or more in consideration of a position of 0.02 CV on the approximate line AL2, the above-described error of the approximate line, and the like.

In the multilayer capacitor C1, it is preferable that a variation in electrostatic capacitance is suppressed to 0.015 CV or less. In this regard, the variation in electrostatic capacitance can be suppressed to 0.015 CV or less by setting the T ratio to 12,000 ppm or more. For example, in the example illustrated in FIG. 7, it is confirmed that the variation in electrostatic capacitance is suppressed to 0.015 CV or less by setting the T ratio to 12,000 ppm or more in consideration of a position of 0.015 CV on the approximate line AL2, the above-described error of the approximate line, and the like.

In the multilayer capacitor C1 it is preferable that a variation in electrostatic capacitance is suppressed to 0.01 CV or less. In this regard, the variation in electrostatic capacitance can be suppressed to 0.01 CV or less by setting the T ratio to 12,500 ppm or more. For example, in the example illustrated in FIG. 7, it is confirmed that the variation in electrostatic capacitance is suppressed to 0.01 CV or less by setting the T ratio to 12,500 ppm or more in consideration of a position of 0.01 CV on the approximate line AL2, the above-described error of the approximate line, and the like.

Specifically, the TGap ratio ranges preferably from 96,000 ppm to 176,000 ppm. Further, the TGap ratio is more preferably 165,000 ppm or less and further preferably 154,000 ppm or less. In addition, the TGap ratio is more preferably 121,000 ppm or more and further preferably 137,000 ppm or more.

In the multilayer capacitor C1, it is preferable that the generation of base material thermal cracks is suppressed to 20% or less. In this regard, the generation of base material thermal cracks can be suppressed to 20% or less by setting the TGap ratio to 176,000 ppm or less. For example, in the example illustrated in FIG. 8, it is confirmed that the generation of base material thermal cracks is suppressed to 20% or less by setting the TGap ratio to 176,000 ppm or less in consideration of a position of 20% on the approximate line AL3, the above-described error of the approximate line, and the like.

In the multilayer capacitor C1, it is more preferable that the generation of base material thermal cracks is suppressed to 10% or less. In this regard, the generation of base material thermal cracks can be suppressed to 10% or less by setting the TGap ratio to 165,000 ppm or less. For example, in the example illustrated in FIG. 8, it is confirmed that the generation of base material thermal cracks is suppressed to 10% or less by setting the TGap ratio to 165,000 ppm or less in consideration of a position of 10% on the approximate line AL3, the above-described error of the approximate line, and the like.

In the multilayer capacitor C1, it is more preferable that the generation of base material thermal cracks is suppressed to 0%. In this regard, the generation of base material thermal cracks can be suppressed to 0% or less by setting the TGap ratio to 154,000 ppm or less. For example, in the example illustrated in FIG. 8, it is confirmed that the generation of base material thermal cracks is suppressed to 0% by setting the TGap ratio to 154,000 ppm or less in consideration of a position of 0% on the approximate line AL3, the above-described error of the approximate line, and the like.

In the multilayer capacitor C1, it is preferable that a variation in electrostatic capacitance is suppressed to 0.035 CV or less. In this regard, the variation in electrostatic capacitance can be suppressed to 0.035 CV or less by setting the TGap ratio to 96,000 ppm or more. For example, in the example illustrated in FIG. 8, it is confirmed that the variation in electrostatic capacitance is suppressed to 0.035 CV or less by setting the TGap ratio to 96,000 ppm or more in consideration of a position of 0.035 CV on the approximate line AL4, the above-described error of the approximate line, and the like.

In the multilayer capacitor C1, it is preferable that a variation in electrostatic capacitance is suppressed to 0.02 CV or less. In this regard, the variation in electrostatic capacitance can be suppressed to 0.02 CV or less by setting the TGap ratio to 121,000 ppm or more. For example, in the example illustrated in FIG. 8, it is confirmed that the variation in electrostatic capacitance is suppressed to 0.02 CV or less by setting the TGap ratio to 121,000 ppm or more in consideration of a position of 0.02 CV on the approximate line AL4, the above-described error of the approximate line, and the like.

In the multilayer capacitor C1, it is preferable that a variation in electrostatic capacitance is suppressed to 0.01 CV or less. In this regard, the variation in electrostatic capacitance can be suppressed to 0.01 CV or less by setting the TGap ratio to 137,000 ppm or more. For example, in the example illustrated in FIG. 8, it is confirmed that the variation in electrostatic capacitance is suppressed to 0.01 CV or less by setting the TGap ratio to 137,000 ppm or more in consideration of a position of 0.01 CV on the approximate line AL4, the above-described error of the approximate line, and the like.

Next, actions and effects of the multilayer capacitor C1 according to the present embodiment will be described.

When the protrusion amount β is too large, there is a high possibility that cracks are generated because of a difference in thermal shrinkage rate between the inner layer portion 20 and the outer layer portion 22, whereas when the protrusion amount β is too small, there is a possibility that a variation in electrostatic capacitance is affected by poor contact between the internal electrodes 11 and 13 and the external electrodes 5 and 7 caused by layer thinning, multilayering, or the like. On the other hand, as a result of earnest research, the inventors have reached that there is a correlation between the T ratio of the protrusion amount β to the dimension T of the element body 2 in the second direction D2 and the performance of the multilayer capacitor C1, and have found an appropriate range. Specifically, cracks can be suppressed by setting the T ratio of the protrusion amount β to the dimension T of the element body 2 in the second direction D2 to 16,000 ppm or less. In addition, a variation in electrostatic capacitance can be suppressed by setting the T ratio of the protrusion amount β to the dimension T of the element body 2 in the second direction D2 to 11,000 ppm or more. As described above, the performance of the multilayer capacitor C1 can be improved.

The T ratio may be 15,000 ppm or less or may be 14,000 ppm or less. In this case, cracks can be further suppressed.

The T ratio may be 12,000 or more or may be 12,500 ppm or more. In this case, a variation in electrostatic capacitance can be further reduced.

In addition, as a result of earnest research, the inventors have reached that there is a correlation between the TGap ratio of the protrusion amount β to the dimension TGap of one outer layer portion 22 in the second direction D2 and the performance of the multilayer capacitor C1, and have found an appropriate range. Specifically, cracks can be suppressed by setting the TGap ratio of the protrusion amount β to the dimension TGap of one outer layer portion 22 in the second direction D2 to 176,000 ppm or less. In addition, a variation in electrostatic capacitance can be suppressed by setting the ratio of the protrusion amount β to the dimension TGap of one outer layer portion 22 in the second direction D2 to 96,000 ppm or more. As described above, the performance of the multilayer capacitor C1 can be improved.

The TGap ratio may be 165,000 ppm or less or may be 154,000 ppm or less. In this ease, cracks can be further suppressed.

The TGap ratio may be 121,000 or more or may be 137,000 ppm or more. In this case, a variation in electrostatic capacitance can be further reduced.

The internal electrodes 11 and 13 may include the main electrode portions 11a and 13a forming electrostatic capacitances, and the connecting portions 11b and 13b that connect the main electrode portions 11a and 13a and the external electrodes 5 and 7. The width dimensions of the connecting portions 11b and 13b may be smaller than the width dimensions of the main electrode portions 11a and 13a in the third direction D3 where the pair of side surfaces 2e and 2f face each other. In this ease, the infiltration of a plating solution in the vicinity of the connecting portions 11b and 13b can be suppressed, whereas cracks or a variation in electrostatic capacitance is likely to be generated. On the other hand, when the T ratio and the TGap ratio are set within the above-described ranges, cracks or a variation in electrostatic capacitance can he suppressed while the infiltration of the plating solution is suppressed.

The present invention is not limited to the above-described embodiment.

In the above-described embodiment, the dimension TGap of the pair of outer layer portions 22 have been described as being the same. However, the dimension TGap may be differ between the outer layer portion 22 on an upper side and the outer layer portion 22 on a lower side. In this case, in relation to the dimension TGap of at least one outer layer portion 22, the range of the TGap ratio may be included in the above-described range. In addition, the pair of external electrodes 5 and 7 are provided, and the ranges of the T ratio and the TGap ratio may be included in the above-described ranges in at least one of the external electrodes 5 and 7.

In addition, according to the present invention, the range of at least the TGap ratio may be included in the above-described range, and the range of the T ratio may not be necessarily included in the above-described range.

[Evaluation]

The results of the experiments shown in FIGS. 6A and 6B that are performed under the above-described experimental conditions are evaluated. Here, the component A, the component C-6, and the component C-7 are given as comparative examples, and the component B and the components C-1 to C-5 are given as examples. In all the component B and the components C-1 to C-5 according to the examples, the generation of thermal cracks is suppressed to 20% or less, and a variation in electrostatic capacitance is also suppressed to 0.035 CV or less (two decimal places are rounded).

REFERENCE SIGNS LIST

2: element body, 5, 7: external electrode, 11, 13: internal electrode, 11a, 13a: main electrode portion, 11b, 13b: connecting portion, 20: inner layer portion, 22: outer layer portion, C1: multilayer capacitor.

What is claimed is:

1. A multilayer capacitor comprising:
   an element body having a pair of end surfaces facing each other, and a pair of side surfaces and a pair of main surfaces located between the pair of end surfaces to extend in a first direction where the pair of end surfaces face each other; and
   a pair of external electrodes disposed on the pair of end surfaces,
   wherein the element body includes an inner layer portion in which a plurality of internal electrodes and a plurality of dielectric layers are alternately stacked in a second direction where the pair of main surfaces face each other, and a pair of outer layer portions disposed outside the inner layer portion in the second direction, the pair of outer layer portions contacting the pair of external electrodes at the pair of end surfaces,
   on at least one of the pair of end surfaces, the internal electrode of the inner layer portion protrudes outward in the first direction from the outer layer portion by a predetermined protrusion amount,
   a ratio of the protrusion amount to a dimension of one outer layer portion in the second direction ranges from 121,000 ppm to 154,000 ppm, and
   at least one outer layer portion of the pair of outer layer portions has a thickness in the second direction that ranges from 90 um to 200 um.

2. The multilayer capacitor according to claim 1, wherein the ratio is 137,000 ppm or more.

3. The multilayer capacitor according to claim 1, wherein the internal electrode includes a main electrode portion forming an electrostatic capacitance, and a connecting portion that connects the main electrode portion and the external electrode, and
   a width dimension of the connecting portion is smaller than a width dimension of the main electrode portion in a third direction where the pair of side surfaces face each other.

4. The multilayer capacitor according to claim 1, wherein, when viewed in a direction perpendicular to the second direction, the pair of outer layer portions are located inside the external electrodes in the second direction.

5. The multilayer capacitor according to claim 1, wherein, one main surface of the pair of main surfaces is partially covered by a first portion of one of the pair of external electrodes and a second portion of the other of the pair of external electrodes,
   the first portion forming a first protrusion that protrudes from the main surface in the second direction,
   the second portion forming a second protrusion that protrudes from the main surface in the second direction, and
   when viewed in a third direction where the pair of side surfaces face each other, the first protrusion and the second protrusion form a space therebetween in the first direction, the space being entirely clear of the pair of outer layer portions.

6. The multilayer capacitor according to claim 1, wherein a thickness of the element body in the second direction defined by the pair of outer layer portions is smaller than a dimension of the pair of external electrodes in the second direction.

7. The multilayer capacitor according to claim 1, wherein at least one of the pair of main surfaces has portions that are covered by the external electrodes and portions that are exposed from the external electrodes, and the portions exposed from the external electrodes constitute a flat surface in a plane that extends in the first direction and the third direction.

8. The multilayer capacitor according to claim 1, wherein the element body has a rectangular parallelepiped shape with chamfered corners, each corner having a round shape with a radius of curvature in a range of 50 to 200 µm.

* * * * *